(12) United States Patent
Feng

(10) Patent No.: US 10,887,933 B2
(45) Date of Patent: Jan. 5, 2021

(54) DEVICE-TO-DEVICE COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 131 days.

(21) Appl. No.: 16/066,053

(22) PCT Filed: Mar. 28, 2016

(86) PCT No.: PCT/CN2016/077512
§ 371 (c)(1),
(2) Date: Jun. 25, 2018

(87) PCT Pub. No.: WO2017/166022
PCT Pub. Date: Oct. 5, 2017

(65) Prior Publication Data
US 2020/0015297 A1 Jan. 9, 2020

(51) Int. Cl.
*H04W 76/14* (2018.01)
*H04W 8/02* (2009.01)
(Continued)

(52) U.S. Cl.
CPC ............. *H04W 76/14* (2018.02); *H04W 8/02* (2013.01); *H04W 8/24* (2013.01);
(Continued)

(58) Field of Classification Search
CPC ..... H04W 8/183; H04W 64/006; H04W 8/24; H04W 8/005; H04W 72/048; H04L 12/185
See application file for complete search history.

(56) References Cited

U.S. PATENT DOCUMENTS 10,334,563 B2 * 6/2019 Chen ...................... H04W 4/80
2011/0134827 A1 6/2011 Hooli
(Continued)

FOREIGN PATENT DOCUMENTS

CN 101352060 B 2/2012
CN 102714890 A 10/2012
(Continued)

OTHER PUBLICATIONS

Supplementary European Search Report in the European application No. 16895803.1, dated Jun. 24, 2019.
(Continued)

*Primary Examiner* — Afshawn M Towfighi
(74) *Attorney, Agent, or Firm* — Ladas & Parry, LLP

(57) ABSTRACT

Provided in an embodiment of the invention are a device-to-device communication method, a terminal device, and a network device. The method includes that: a first terminal transmits a first message to a network device, the first terminal being used to request acquisition of attribute information of a second terminal; the first terminal receives a second message transmitted by the network device, the second message being used to indicate the attribute information of the second terminal; and the first terminal performs data transmission with the second terminal on the basis of the attribute information of the second terminal. The embodiment of the invention can increase a probability of successful data transmission in D2D communication.

17 Claims, 3 Drawing Sheets

(51) Int. Cl.
*H04W 8/24* (2009.01)
*H04W 72/04* (2009.01)
*H04W 88/06* (2009.01)
*H04W 92/18* (2009.01)

(52) U.S. Cl.
CPC ....... *H04W 72/0413* (2013.01); *H04W 88/06* (2013.01); *H04W 92/18* (2013.01)

(56) References Cited

U.S. PATENT DOCUMENTS

| | | | |
|---|---|---|---|
| 2014/0078971 A1* | 3/2014 | Bontu | H04W 8/005 370/329 |
| 2014/0204847 A1* | 7/2014 | Belleschi | H04W 76/14 370/329 |
| 2014/0274066 A1 | 9/2014 | Fodor et al. | |
| 2015/0133112 A1 | 5/2015 | Wang et al. | |
| 2015/0201452 A1 | 7/2015 | Wang et al. | |
| 2015/0215767 A1 | 7/2015 | Siomina et al. | |
| 2017/0223725 A1* | 8/2017 | Xiong | H04L 5/0053 |
| 2019/0036595 A1* | 1/2019 | Ohtsuji | H04B 7/15 |

FOREIGN PATENT DOCUMENTS

| | | |
|---|---|---|
| CN | 103581890 A | 2/2014 |
| CN | 103595750 A | 2/2014 |
| CN | 103716853 A | 4/2014 |
| CN | 103974379 A | 8/2014 |
| EP | 2866369 A1 | 4/2015 |
| JP | 2015526982 A | 9/2015 |
| WO | 2010006649 A1 | 1/2010 |
| WO | 2011097980 A1 | 8/2011 |
| WO | 2013055271 A1 | 4/2013 |
| WO | 2015167287 A1 | 11/2015 |
| WO | 2016018469 A1 | 2/2016 |

OTHER PUBLICATIONS

English translation of the Written Opinion of the International Search Authority in the international application No. PCT/CN2016/077512, dated Jan. 3, 2017.
International Search Report in international application No. PCT/CN2016/077512, dated Jan. 3, 2017.
The Written Opinion of the International Search Authority in international application No. PCT/CN2016/077512, dated Jan. 3, 2017.
First Office Action of the Japanese application No. 2018-535870, dated Jan. 10, 2020.
First Office Action of the Taiwanese application No. 106110232, dated Apr. 30, 2020.
First Office Action of the Chinese application No. 201680073803.7, dated May 18, 2020, with search report.
First Office Action of the Indian application No. 201817027992, dated Jun. 3, 2020.
3GPP TS 36.306 V13.0.0 (Dec. 2015), 3rd Generation Partnership Project; Technical Specification Group Radio Access Network; Evolved Universal Terrestrial Radio Access (E-UTRA); User Equipment (UE) radio access capabilities (Release 13), Dec. 2015, entire document.
3GPP TS 23.303 V13.2.0 (Dec. 2015), 3rd Generation Partnership Project; Technical Specification Group Services and System Aspects; Proximity-based services (ProSe); Stage 2 (Release 13), Dec. 2015, entire document.
Second Office Action of the Japanese application No. 2018-535870, dated Sep. 2020.

* cited by examiner

DEVICE-TO-DEVICE COMMUNICATION METHOD, TERMINAL DEVICE, AND NETWORK DEVICE

RELATED APPLICATION

This application is an application under 35 U.S.C. 371 of International Application No. PCT/CN2016/077512 filed on Mar. 28, 2016, the entire contents of which are incorporated herein by reference.

TECHNICAL FIELD

Embodiments of the present disclosure relate to the field of communications, and more particularly to a Device-to-Device (D2D) communication method, a terminal device and a network device.

BACKGROUND

D2D technology refers to a method that neighboring terminals may perform data transmission through a direct link in a short-distance range without a forwarding operation of a network device.

The D2D technology is a D2D technology capable of sharing a licensed frequency band resource with a cellular system to form a unified hybrid cellular and D2D network.

During D2D communication, communication between terminals may be implemented without scheduling of the network device, which may easily cause a data transmission failure. Therefore, there is an urgent need for a communication method to improve a success rate of D2D communication.

SUMMARY

The embodiments of the disclosure provide a D2D communication method, a terminal device and a network device, which may increase a success rate of data transmission for D2D communication.

A first aspect provides a D2D communication method, which may include that: a first terminal sends a first message to a network device, wherein the first message is configured to request acquisition of attribute information of a second terminal; the first terminal receives a second message sent by the network device, wherein the second message is configured to indicate the attribute information of the second terminal; and the first terminal performs data transmission with the second terminal on the basis of the attribute information of the second terminal.

In combination with the first aspect, in a first possible implementation mode of the first aspect, the attribute information of the second terminal may be first capability information, the first capability information may be capability information of the second terminal to communicate with the first terminal, and the operation that the first terminal performs data transmission with the second terminal may include that: the first terminal performs data transmission with the second terminal on the basis of the first capability information.

In combination with the first aspect, in a second possible implementation mode of the first aspect, the attribute information of the second terminal may be second capability information, the second capability information may be capability information of the second terminal to communicate with the network device, and the operation that the first terminal performs data transmission with the second terminal may include that: the first terminal determines first capability information on the basis of the second capability information, wherein the first capability information is the capability information of the second terminal to communicate with the first terminal; and the first terminal performs data transmission with the second terminal on the basis of the first capability information.

In combination with the first or second possible implementation mode of the first aspect, in a third possible implementation mode of the first aspect, the first capability information may include at least one of a maximum receiving bandwidth, a maximum sending bandwidth, a maximum data block size that can be sent, a maximum data block size that can be received, a number of transmit antennas or a number of receive antennas of the second terminal during data transmission with the first terminal.

Optionally, the second capability information may include Packet Data Convergence Protocol (PDCP) layer, Radio Link Control (RLC) layer, physical layer, radio frequency capability information or the like of the second terminal.

Therefore, in a D2D communication process, the first terminal requests the network device for the attribute information of the second terminal and performs communication with the second terminal according to the attribute information of the second terminal, and a success rate of data communication may be increased. For example, if the attribute information includes the maximum receiving bandwidth, the maximum data block size that can be received or the number of receive antennas of the second terminal, a data receiving failure, caused by an excessively large bandwidth occupied by the sent data and an excessively large data block, of the second terminal may be avoided. For example, if the attribute information includes the maximum sending bandwidth, the maximum data block size that can be sent or the number of transmit antennas of the second terminal, a data receiving failure of the first terminal may be avoided.

Furthermore, the first terminal determines the capability information of the second terminal to communicate with the first terminal on the basis of the capability information of the second terminal to communicate with the network device, and D2D communication may be performed with reference to cellular network communication capability information, so that a success rate of D2D communication may be increased without changing a protocol as much as possible.

In combination with the first aspect or any abovementioned possible implementation mode thereof, in a fourth possible implementation mode of the first aspect, the operation that the first terminal sends the first message to the network device may include that: the first terminal sends an uplink Radio Resource Control (RRC) message to a base station, wherein the uplink RRC message is configured to request acquisition of the attribute information of the second terminal; and the operation that the first terminal receives the second message sent by the network device may include that: the first terminal receives a downlink RRC message sent by the base station, wherein the downlink RRC message is configured to indicate the attribute information of the second terminal.

In combination with the first aspect or any abovementioned possible implementation mode thereof, in a fifth possible implementation mode of the first aspect, the operation that the first terminal sends the first message to the network device may include that: the first terminal sends an uplink Non-Access Stratum (NAS) message to a Mobility Management Entity (MME), wherein the uplink NAS message is configured to request acquisition of the attribute information of the second terminal; and the operation that the first terminal receives the second message sent by the network device may include that: the first terminal receives a downlink RRC message sent by the MME, wherein the downlink RRC message is configured to indicate the attribute information of the second terminal.

In combination with the first aspect or any abovementioned possible implementation mode thereof, in a sixth possible implementation mode of the first aspect, a radio frequency bandwidth supported by the second terminal may be less than or equal to 1.4 MHZ.

A second aspect provides a D2D communication method, which may include that: a network device receives a first message from a first terminal, wherein the first message is configured to request acquisition of attribute information of a second terminal; the network device acquires the attribute information of the second terminal according to the first message; and the network device sends a second message to the first terminal, wherein the second message is configured to indicate the attribute information of the second terminal according to which the first terminal sends data to the second terminal.

In combination with the second aspect, in a first possible implementation mode of the second aspect, the attribute information of the second terminal may be first capability information, and the first capability information may be capability information of the second terminal to communicate with the first terminal.

In combination with the first possible implementation mode of the second aspect, in a second possible implementation mode of the second aspect, the first capability information may include at least one of a maximum receiving bandwidth, a maximum sending bandwidth, a maximum data block size that can be sent, a maximum data block size that can be received, a number of transmit antennas or a number of receive antennas of the second terminal during data transmission with the first terminal.

In combination with the second aspect, in a third possible implementation mode of the second aspect, the attribute information of the second terminal may be second capability information, and the second capability information may be capability information of the second terminal to communicate with the network device.

In combination with the second aspect or any abovementioned possible implementation mode thereof, in a fourth possible implementation mode of the second aspect, the network device may be a base station; the operation that the network device receives the first message sent by the first terminal may include that: the base station receives an uplink RRC message sent by the first terminal, wherein the uplink RRC message is configured to request acquisition of the attribute information of the second terminal; the operation that the network device acquires the attribute information of the second terminal may include that: locally stored attribute information of the second terminal is acquired, or an MME is requested for the attribute information of the second terminal; and the operation that the network device sends the second message to the second terminal may include that: the base station sends a downlink RRC message to the first terminal, wherein the downlink RRC message is configured to indicate the attribute information of the second terminal.

In combination with the second aspect or any abovementioned possible implementation mode thereof, in a fifth possible implementation mode of the second aspect, the network device may be an MME; the operation that the network device receives the first message sent by the first terminal may include that: the MME receives an uplink NAS message sent by the first terminal, wherein the uplink NAS message is configured to request acquisition of the attribute information of the second terminal; the operation that the network device acquires the attribute information of the second terminal may include that: locally stored attribute information of the second terminal is acquired, or a NAS is requested for the attribute information of the second terminal; and the operation that the network device sends the second message to the second terminal may include that: the MME sends a downlink NAS message to the first terminal, wherein the NSA response message is configured to indicate the attribute information of the second terminal.

In combination with the second aspect or any abovementioned possible implementation mode thereof, in a sixth possible implementation mode of the second aspect, a radio frequency bandwidth supported by the second terminal may be less than or equal to 1.4 MHZ.

A third aspect provides a terminal, which is configured to execute the method in the first aspect or any optional implementation mode of the first aspect. Specifically, the communication device includes module units configured to execute the method in the first aspect or any possible implementation mode of the first aspect.

A fourth aspect provides a network device, which is configured to execute the method in the second aspect or any optional implementation mode of the second aspect. Specifically, the communication device includes module units configured to execute the method in the second aspect or any possible implementation mode of the second aspect.

A fifth aspect provides a terminal, which includes a memory and a processor. The memory is configured to store an instruction, the processor is configured to execute the instruction stored in the memory, and when the processor executes the instruction stored in the memory, such execution enables the processor to execute the method in the first aspect or any optional implementation mode of the first aspect.

A sixth aspect provides a network device, which includes a memory and a processor. The memory is configured to store an instruction, the processor is configured to execute the instruction stored in the memory, and when the processor executes the instruction stored in the memory, such execution enables the processor to execute the method in the second aspect or any optional implementation mode of the second aspect.

A seventh aspect provides a computer storage medium, in which a program code is stored, the program code being configured to indicate the method in the first aspect or any optional implementation mode of the first aspect to be executed.

An eighth aspect provides a computer storage medium, in which a program code is stored, the program code being configured to indicate the method in the second aspect or any optional implementation mode of the second aspect to be executed.

BRIEF DESCRIPTION OF DRAWINGS

In order to describe the technical solutions of the embodiments of the disclosure more clearly, the drawings required to be used in descriptions about the embodiments or a conventional art will be simply introduced below. Obviously, the drawings described below are only some embodiments of the disclosure. Other drawings may further be obtained by those of ordinary skilled in the art according to these drawings without creative work.

DETAILED DESCRIPTION

Figure 1:
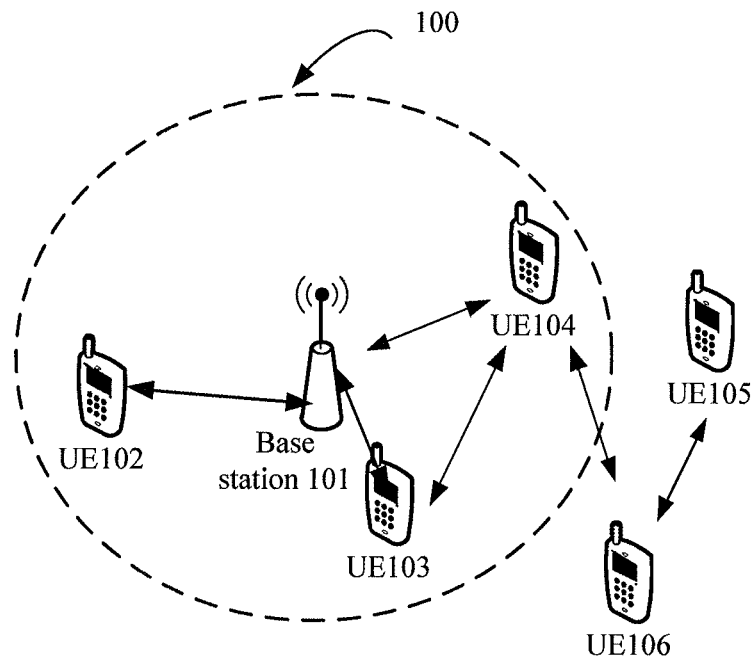
FIG. 1 is a diagram of an application scenario according to an embodiment of the disclosure.

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art on the basis of the embodiments in the disclosure without creative work shall fall within the scope of protection of the disclosure.

Terms "part", "module", "system" and the like used in the specification are adopted to represent a computer related entity, hardware, firmware, hardware and software combination, software or software in execution. For example, a part may be, but not limited to, a process running on a processor, the processor, an object, an executable file, an execution thread, a program and/or a computer. The drawings illustrate that an application running on computing equipment and the computing equipment may both be parts. One or more parts may reside in a process and/or an execution thread, and the parts may be located on a computer and/or distributed between two or more computers. In addition, these parts may be executed from various computer-readable media with various data structures stored thereon. The parts may communicate through local and/or remote processes according to, for example, signals with one or more data groups (for example, data from two parts interacting with another part of a local system, a distributed system and/or a network, for example, the Internet interacting with another system through a signal).

Each aspect or characteristic of the disclosure may be implemented into a method, a device or a product programmed with a standard and/or using an engineering technology. Term "product" used in the disclosure covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD), a Digital Versatile Disk (DVD)), a smart card and a flash memory (for example, an Erasable Programmable Read-Only Memory (EPROM), a card, a stick or a key driver). In addition, various storage media described in the disclosure may represent one or more devices and/or other machine-readable media configured to store information. Term "machine-readable medium" may include, but not limited to, a wireless channel and various other media capable of storing, including and/or bearing instructions and/or data.

A terminal device in the embodiments of the disclosure may also be called as an access terminal, a user unit, a user station, a mobile station, a mobile radio station, a remote station, a remote terminal, a mobile terminal, a user terminal, User Equipment (UE), a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), handheld equipment with a wireless communication function, computing equipment or other processing equipment connected to a wireless modem, vehicle-mounted equipment, wearable equipment and terminal equipment in a future 5th-Generation (5G) network. A base station may be a Base Transceiver Station (BTS) in a Global System of Mobile Communication (GSM) or Code Division Multiple Access (CDMA), may also be a NodeB (NB) in Wideband Code Division Multiple Access (WCDMA), and may further be an Evolutional Node B (eNB or eNodeB) in Long Term Evolution (LTE), or a relay station or access point. A network device may be a base station, an MME, vehicle-mounted equipment, wearable equipment, network equipment in the future 5G network and the like.

FIG. 1 is a schematic diagram of an application scenario 100 according to an embodiment of the disclosure. In FIG. 1, UE 102, UE 103 and UE 104 are in coverage of a base station 101, the UE 102, the UE 103 and the UE 104 may directly communicate with the base station, and the UE 102, the UE 103 and the UE 104 may perform D2D communication. UE 105 and UE 106 are out of the coverage of the base station, and the UE 105 and the UE 106 may directly perform D2D communication or perform D2D communication with the UE 102, the UE 103 and the UE 104.

D2D technology has the following advantages by virtue of its own short-distance communication characteristic and direct communication manner.

1: the short-distance direct communication manner for a terminal may achieve a higher data rate, a shorter delay and lower power consumption;

2: by virtue of a short-distance characteristic of terminals and D2D communication links widely distributed in a network, effective utilization of spectrum resources may be implemented, and a resource space division multiplexing gain may be obtained;

3: the D2D direct communication manner may be adapted to a local data sharing requirement of a service such as wireless Point-to-Point (P2P) and provide data service with high flexible adaptability; and 4: D2D direct communication may extend coverage of the network by virtue of a large number of widely distributed communication terminals in the network.

In a hybrid cellular and D2D network, terminals may communicate in two different modes. The first mode is a cellular communication mode: the terminals communicate through base stations. The second mode is a D2D mode: the terminals directly communicate by virtue of D2D links. In the hybrid network, part of terminals still perform information forwarding and communication through the base stations in the cellular communication mode, but part of terminals perform direct data transmission in the D2D mode.

D2D not only is adopted for a public security service but also may be widely applied to commercial scenarios to solve practical problems about coverage extension, device power saving and the like. For example, coverage enhancement may be implemented through a terminal relay technology, a terminal out of coverage of a cellular network may implement data communication with the network through a relay, and thus extension of the coverage of the network is implemented in a sense. In addition, similar short-distance communication may be adopted to reduce sending power of the terminal and favorably prolong service life of a battery of the terminal.

Along with the rise of the Internet of things, supporting Machine Type Communication (MTC) in an LTE system attracts more and more attentions. A physical-layer enhancement project for MTC is set up in 3rd Generation Partnership Project (3GPP) Release 13. An MTC device (MTC terminal) may have part of multiple Machine to Machine (M2M) communication characteristics, for example, characteristics of low mobility, small transmitted data volume, insensitivity to a communication delay, requirement on extremely low power consumption and the like. For reducing cost of an MTC terminal, a new terminal type is defined, and both of its uplink and downlink support a 1.4 MHz radio frequency bandwidth or a smaller system bandwidth, for example, 200 KHz.

In a D2D communication process, when a sending terminal does not know about attribute information of a receiving terminal, data transmission may exceed a receiving limit of the receiving terminal, for example, a receiving bandwidth or a maximum received block size may be exceeded, to make it impossible for the receiving terminal to correctly receive data. Therefore, the embodiments of the disclosure provide a D2D communication method, a terminal device and a network device.

Figure 2:
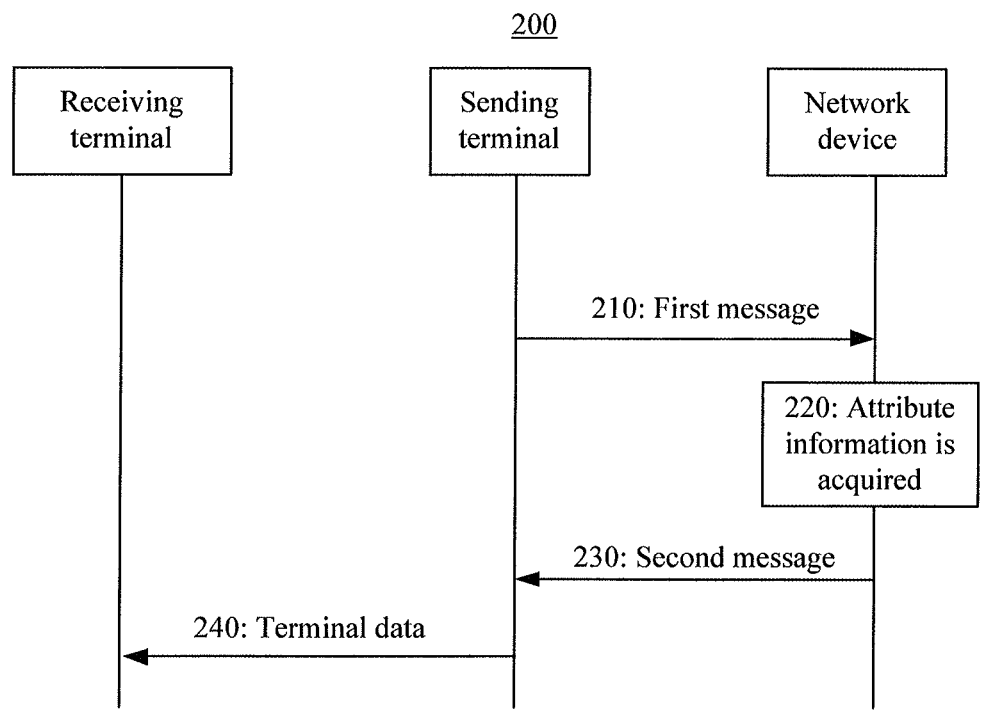
FIG. 2 is a schematic flowchart of a D2D communication method according to an embodiment of the disclosure.

FIG. 2 is a schematic flowchart of a D2D communication method according to an embodiment of the disclosure.

In 210, a first terminal sends a first message to a network device, wherein the first message is configured to request acquisition of attribute information of a second terminal.

Optionally, the first message may contain an identifier of the second terminal and a requested content.

In 220, the network device acquires the attribute information of the first terminal after receiving the first message sent by the first terminal.

In 230, the network device sends a second message to the first terminal, wherein the second message includes the attribute information of the first terminal.

Optionally, the network device may send the second message in a manner of a transparent container or an explicit element.

In 240, the first terminal performs data transmission with the second terminal after receiving the second message sent by the network device.

Optionally, in the embodiment of the disclosure, the first terminal may send data to the second terminal through a PC5 interface, wherein the PC5 interface is a communication interface between the terminals.

Optionally, the attribute information of the second terminal is first capability information, and the first capability information is capability information of the second terminal to communicate with the first terminal. The first terminal performs data transmission with the second terminal on the basis of the first capability information.

That is, the network device may directly notify the capability information of the second terminal about communication with the first terminal to the first terminal, so that the first terminal may directly perform data transmission according to the capability information of the second terminal to communicate with the first terminal.

Optionally, the attribute information of the second terminal is second capability information of the second terminal, and the second capability information is capability information of the second terminal to communicate with the network device. The first terminal determines the first capability information on the basis of the second capability information, the first capability information being the capability information of the second terminal to communicate with the first terminal; and the first terminal performs data transmission with the second terminal on the basis of the first capability information.

That is, the network device may directly notify the capability information of the second terminal about communication with the network device to the first terminal, and the first terminal may determine the capability information of the second terminal to communicate with the first terminal on the basis of the capability information of the second terminal to communicate with the network device.

For example, the first terminal may directly determine the capability information of the second terminal to communicate with the network device as the capability information of the second terminal to communicate with the first terminal. For example, the first terminal may directly take the capability information of the second terminal to communicate with the network device as the capability information of the second terminal to communicate with the first terminal.

Optionally, the first capability information includes at least one of a maximum receiving bandwidth, a maximum sending bandwidth, a maximum data block size that can be sent, a maximum data block size that can be received, a number of transmit antennas or a number of receive antennas of the second terminal during data transmission with the first terminal.

Optionally, the second capability information may include PDCP layer, RLC layer, physical layer, radio frequency capability information or the like of the second terminal.

Therefore, in a D2D communication process, the first terminal requests the network device for the attribute information of the second terminal and performs communication with the second terminal according to the attribute information of the second terminal, and a success rate of data communication may be increased. For example, if the attribute information includes the maximum receiving bandwidth, the maximum data block size that can be received or the number of receive antennas of the second terminal, a data receiving failure, caused by an excessively large bandwidth occupied by the sent data and an excessively large data block, of the second terminal may be avoided. For example, if the attribute information includes the maximum sending bandwidth, the maximum data block size that can be sent or the number of transmit antennas of the second terminal, a data receiving failure of the first terminal may be avoided.

Furthermore, the first terminal determines the capability information of the second terminal to communicate with the first terminal on the basis of the capability information of the second terminal to communicate with the network device, and D2D communication may be performed with reference to cellular network communication capability information, so that a success rate of D2D communication may be increased without changing a protocol as much as possible.

The network device of the embodiment of the disclosure may be a base station, an MME or other network device. For convenient understanding, the D2D communication method according to the embodiment of the disclosure will be described below with the condition that the network device is a base station or an MME as an example in combination with FIG. 3 and FIG. 4 respectively.

Figure 3:
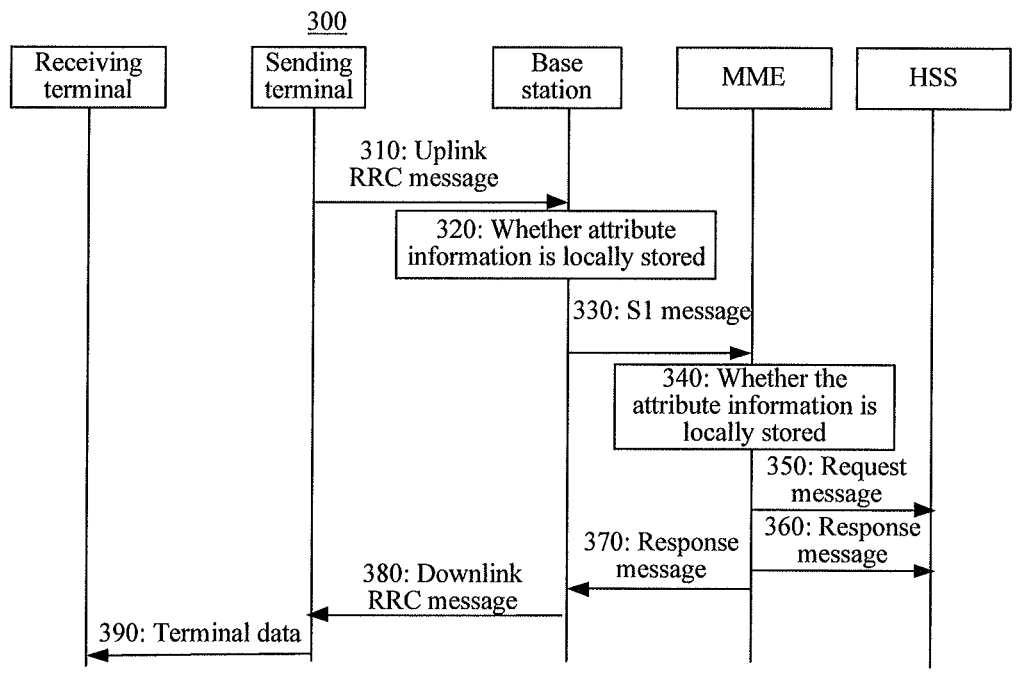
FIG. 3 is a schematic flowchart of a D2D communication method according to an embodiment of the disclosure.

FIG. 3 is a schematic flowchart of a D2D communication method 300 according to an embodiment of the disclosure.

In 310, when a first terminal determines that there is data required to be sent to a second terminal through a PC5 interface, an uplink RRC message for requesting acquisition of attribute information of the second terminal is sent to a base station on a Uu interface.

Optionally, the uplink RRC message may be a sidelinkUEinformation message or any other uplink RRC message.

In 320, the base station determines whether the attribute information of the second terminal is locally stored after receiving the uplink RRC message sent by the first terminal. When the attribute information of the second terminal is locally stored, the operation in 380 is executed, and when the attribute information of the second terminal is not stored, the operation in 330 is executed.

In 330, the base station determines that the attribute information of the second terminal is not stored, and sends a request message to an MME, wherein the request message may be an S1 message, and is configured to request for the attribute information of the second terminal.

In 340, the MME may determine whether the attribute information of the second terminal is locally stored after receiving the request message sent by the base station. When the attribute information of the second terminal is locally stored, the operation in 370 is executed, and when the attribute information of the second terminal is not stored, the operation in 350 is executed.

In 350, the MME determines that the attribute information of the second terminal is not stored, and sends a request message for requesting the attribute information of the second terminal to a Home Subscriber Server (HSS).

In 360, the HSS acquires the attribute information of the second terminal, and sends a response message including the attribute information of the second terminal to the MME.

In 370, the MME sends a response message to the base station after locally acquiring the attribute information of the second terminal or receiving the attribute information sent by the HSS, wherein the response message is configured to contain the attribute information of the second terminal.

In 380, the base station sends a downlink RRC message to the first terminal after locally acquiring the attribute information of the second terminal or receiving the attribute information sent by the MME, wherein the downlink RRC message includes the attribute information of the second terminal.

Optionally, the downlink RRC message is an RRC reconfiguration message.

In 390, the first terminal performs communication with the second terminal according to the attribute information of the second terminal.

Figure 4:
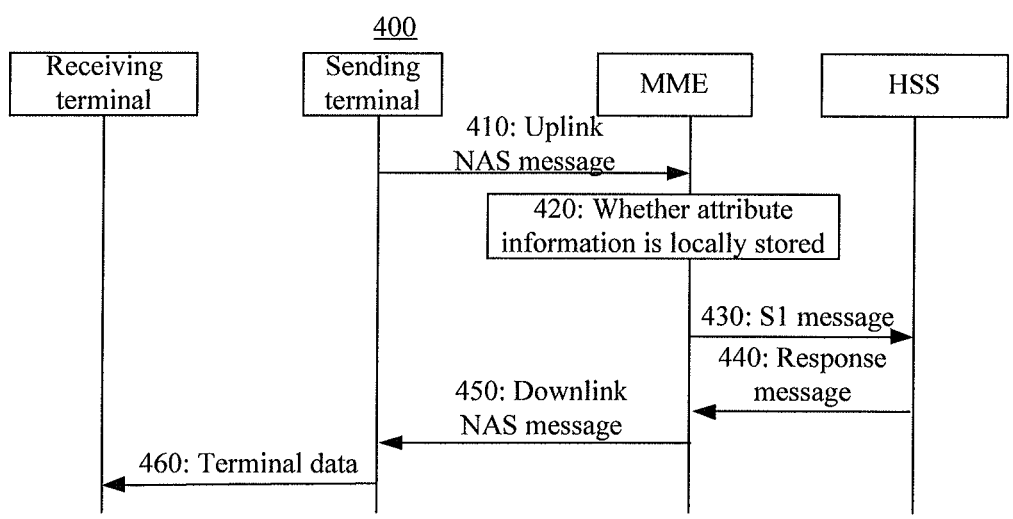
FIG. 4 is a schematic flowchart of a D2D communication method according to an embodiment of the disclosure.

FIG. 4 is a schematic flowchart of a D2D communication method 400 according to an embodiment of the disclosure.

In 410, when a first terminal determines that there is data required to be sent to a second terminal through a PC5 interface, an uplink NAS message for requesting acquisition of attribute information of the second terminal is sent to an MME on a Uu interface. Optionally, the uplink NAS message is a UE information request.

In 420, the MME determines whether the attribute information of the second terminal is locally stored after receiving the uplink NAS message sent by the first terminal. When the attribute information of the second terminal is locally stored, the operation in 460 is executed, and when the attribute information of the second terminal is not stored, the operation in 430 is executed.

In 430, the base station determines that the attribute information of the second terminal is not stored, and sends a request message to an HSS for requesting the attribute information of the second terminal.

In 440, the HSS acquires the attribute information of the second terminal, and sends a response message including the attribute information of the second terminal to the MME.

In 450, the MME sends a downlink NAS message to the first terminal after locally acquiring the attribute information of the second terminal or receiving the attribute information sent by the HSS, wherein the downlink NAS message includes the attribute information of the second attribute. Optionally, the downlink NAS message is a UE information response.

Optionally, the MME may send the attribute information to UE through the downlink NAS message in a manner of an RRC transparent container.

In 460, the first terminal performs communication with the second terminal according to the attribute information of the second terminal.

Each request message of the embodiment of the disclosure may contain an ID of the second terminal and a content object required to be requested. Each response message may contain the ID of the second terminal and a value of the requested content object.

Figure 5:
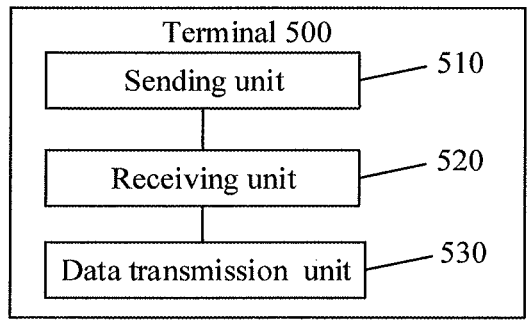
FIG. 5 is a schematic block diagram of a terminal according to an embodiment of the disclosure.

FIG. 5 is a schematic block diagram of a terminal 500 according to an embodiment of the disclosure. As illustrated in FIG. 5, the terminal 500 includes: a sending unit 510, configured to send a first message to a network device, the first message being configured to request acquisition of attribute information of a second terminal; a receiving unit 520, configured to receive a second message sent by the network device, the second message being configured to indicate the attribute information of the second terminal; and a data transmission unit 530, configured to perform D2D communication with the second terminal on the basis of the attribute information of the second terminal.

Optionally, the attribute information of the second terminal is first capability information, and the first capability information is capability information of the second terminal to communicate with the terminal. The data transmission unit 530 may be specifically configured to perform data transmission with the second terminal on the basis of the first capability information.

Optionally, the attribute information of the second terminal is second capability information, and the second capability information is capability information of the second terminal to communicate with the network device. The data transmission unit 530 may be specifically configured to: determine first capability information on the basis of the second capability information, the first capability information being the capability information of the second terminal to communicate with the data transmission unit; and perform data transmission with the second terminal on the basis of the first capability information.

Optionally, the first capability information includes at least one of a maximum receiving bandwidth, a maximum sending bandwidth, a maximum data block size that can be sent, a maximum data block size that can be received, a number of transmit antennas or a number of receive antennas of the second terminal during data transmission with the data transmission unit.

Optionally, the sending unit 510 may be specifically configured to send an uplink RRC message to a base station, wherein the uplink RRC message is configured to request acquisition of the attribute information of the second terminal. The receiving unit 520 may be specifically configured to receive a downlink RRC message sent by the base station, wherein the downlink RRC message is configured to indicate the attribute information of the terminal device.

Optionally, the sending unit 510 may be specifically configured to send an uplink NAS message to an MME, wherein the uplink NAS message is configured to request for acquiring the attribute information of the second terminal. The receiving unit 520 is specifically configured to receive a downlink RRC message sent by the MME, wherein the downlink RRC message is configured to indicate the attribute information of the terminal device.

Optionally, a radio frequency bandwidth supported by the second terminal is less than or equal to 1.4 MHZ.

It should be understood that the terminal 500 may correspond to a first terminal in the method embodiment, and may implement corresponding operations of the first terminal, which will not be elaborated herein for simplicity.

Figure 6:
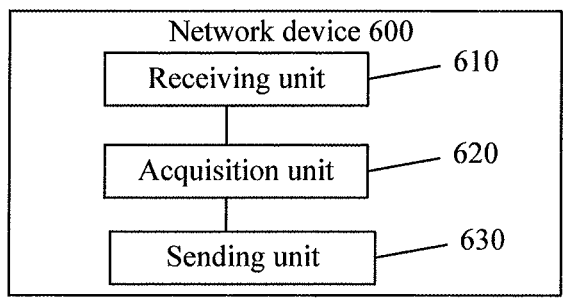
FIG. 6 is a schematic block diagram of a network device according to an embodiment of the disclosure.

FIG. 6 is a schematic block diagram of a network device 600 according to an embodiment of the disclosure. As illustrated in FIG. 6, the network device 600 includes: a receiving unit 610, configured to receive a first message from a first terminal, the first message being configured to request acquisition of attribute information of a second terminal; an acquisition unit 620, configured to acquire the attribute information of the second terminal according to the first message; and a sending unit 630, configured to send a second message to the first terminal, wherein the second message is configured to indicate the attribute information of the second terminal according to which the first terminal performs Device-to-Device (D2D) communication with the second terminal.

Optionally, the attribute information of the second terminal is first capability information, and the first capability information is capability information of the second terminal about communication with the first terminal.

Optionally, the first capability information includes at least one of a maximum receiving bandwidth, a maximum sending bandwidth, a maximum data block size that can be sent, a maximum data block size that can be received, a number of transmit antennas or a number of receive antennas of the second terminal during data transmission with the first terminal.

Optionally, the attribute information of the second terminal is second capability information, and the second capability information is capability information of the second terminal about communication with the network device 600.

Optionally, the network device 600 is a base station. The receiving unit 610 may be specifically configured to receive an uplink RRC message sent by the first terminal, the uplink RRC message being configured to request acquisition of the attribute information of the second terminal. The acquisition unit 620 may be specifically configured to acquire locally stored attribute information of the second terminal, or request an MME for the attribute information of the second terminal. The sending unit 630 may be specifically configured to send a downlink RRC message to the first terminal, the downlink RRC message being configured to indicate the attribute information of the second terminal.

Optionally, the network device 600 may be an MME. The receiving unit 610 may be specifically configured to receive an uplink NAS message sent by the first terminal, the uplink NAS message being configured to request acquisition of the attribute information of the second terminal. The acquisition unit 620 may be specifically configured to acquire locally stored attribute information of the second terminal, or request a NAS for the attribute information of the second terminal. The sending unit 630 may be specifically configured to send a downlink NAS message to the first terminal, wherein the NSA response message is configured to indicate the attribute information of the second terminal.

Optionally, a radio frequency bandwidth supported by the second terminal is less than or equal to 1.4 MHZ.

It should be understood that the network device 600 may correspond to the network device in the method embodiment, and may implement corresponding operations of the network device, which will not be elaborated herein for simplicity.

Figure 7:
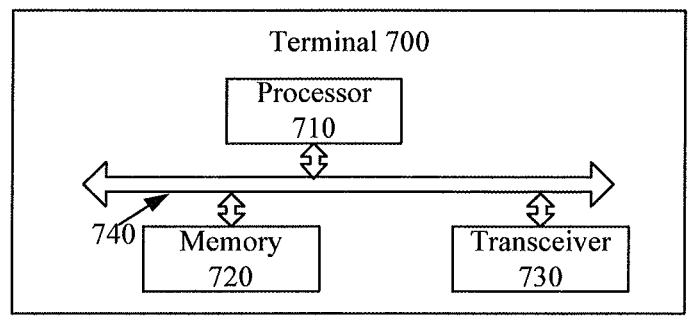
FIG. 7 is a schematic block diagram of a terminal according to an embodiment of the disclosure.

FIG. 7 is a schematic block diagram of a terminal 700 according to an embodiment of the disclosure. The terminal 700 includes a processor 710 and a memory 720. The memory 720 may be configured to store a program instruction. The processor 710 may call the program instruction stored in the memory 720 and may execute corresponding operations of a first terminal in the method embodiment. The terminal 700 may further include a transceiver 730 configured for external communication and a bus system 740 configured to interconnect the processor 710, the memory 720 and the transceiver 730.

The processor 710 may be configured to call the instruction stored in the memory 720 to execute the following operations: sending a first message to a network device through the transceiver 730, the first message being configured to request acquisition of attribute information of a second terminal; receiving a second message sent by the network device through the transceiver 730, the second message being configured to indicate the attribute information of the second terminal; and performing data transmission with the second terminal through the transceiver 730 on the basis of the attribute information of the second terminal.

Optionally, the attribute information of the second terminal is first capability information, and the first capability information is capability information of the second terminal to communicate with the terminal 700. The processor 710 may be configured to call the instruction stored in the memory 720 to execute the following operation: utilizing the transceiver 730 to perform data transmission with the second terminal on the basis of the first capability information.

Optionally, the attribute information of the second terminal is second capability information, the second capability information is capability information of the second terminal to communicate with the network device. The processor 710 may be configured to call the instruction stored in the memory 720 to execute the following operations: determining the first capability information on the basis of the second capability information, the first capability information being the capability information of the second terminal to communicate with the terminal 700; and utilizing the transceiver 730 to perform data transmission with the second terminal on the basis of the first capability information.

Optionally, the first capability information includes at least one of a maximum receiving bandwidth, a maximum sending bandwidth, a maximum data block size that can be sent, a maximum data block size that can be received, a number of transmit antennas or a number of receive antennas of the second terminal during data transmission with the terminal 700.

Optionally, the processor 710 may be configured to call the instruction stored in the memory 720 to execute the following operations: utilizing the transceiver 730 to send an uplink RRC message to a base station, the uplink RRC message being configured to request acquisition of the attribute information of the second terminal; and utilizing the transceiver 730 to receive a downlink RRC message sent by the base station, the downlink RRC message being configured to indicate attribute information of the terminal device.

Optionally, the processor 710 may be configured to call the instruction stored in the memory 720 to execute the following operations: utilizing the transceiver 730 to send an uplink NAS message to an MME, the uplink NAS message being configured to request acquisition of the attribute information of the second terminal; and utilizing the transceiver 730 to receive a downlink RRC message sent by the MME, the downlink RRC message being configured to indicate the attribute information of the terminal device.

Optionally, a radio frequency bandwidth supported by the second terminal is less than or equal to 1.4 MHZ.

It should be understood that the terminal 700 may correspond to a first terminal in the method embodiment, and may implement corresponding operations of the first terminal, which will not be elaborated herein for simplicity.

Figure 8:
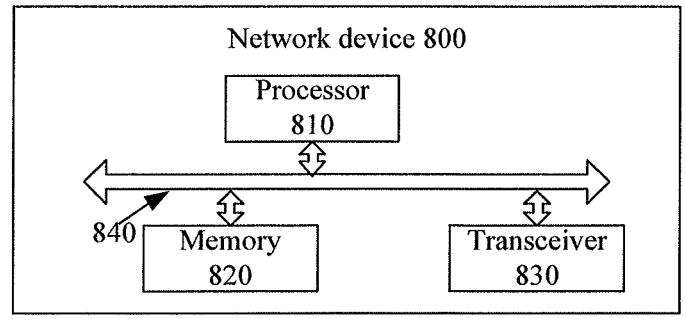
FIG. 8 is a schematic block diagram of a network device according to an embodiment of the disclosure.

FIG. 8 is a schematic block diagram of a network device 800 according to an embodiment of the disclosure. As illustrated in FIG. 8, the network device 800 includes a processor 810 and a memory 820. The memory 820 may be configured to store a program instruction. The processor 810 may call the program instruction stored in the memory 820 and may execute corresponding operations of the network device in the method embodiment. The network device 800 further includes a transceiver 830 configured for external communication and a bus system 840 configured to interconnect the processor 810, the memory 820 and the transceiver 830.

Optionally, the processor 810 may be configured to call the instruction stored in the memory 820 to execute the following operations: receiving a first message of a first terminal through the transceiver 830, the first message being configured to request acquisition of attribute information of a second terminal; acquiring the attribute information of the second terminal; and sending a second message to the first terminal through the transceiver 830, the second message being configured to indicate the attribute information of the second terminal according to which the first terminal sends data to the second terminal.

Optionally, the attribute information of the second terminal is first capability information, and the first capability information is capability information of the second terminal about communication with the first terminal.

Optionally, the first capability information includes at least one of a maximum receiving bandwidth, a maximum sending bandwidth, a maximum data block size that can be sent, a maximum data block size that can be received, a number of transmit antennas or a number of receive antennas of the second terminal during data transmission with the first terminal.

Optionally, the attribute information of the second terminal is second capability information, and the second capability information is capability information of the second terminal about communication with the network device 800.

Optionally, the network device 800 is a base station. The processor 810 may be configured to call the instruction stored in the memory 820 to execute the following operations: utilizing the transceiver 830 to receive the first message sent by the first terminal, the operation including that: the base station receives an uplink RRC message sent by the first terminal, the uplink RRC message being configured to request acquisition of the attribute information of the second terminal; acquiring locally stored attribute information of the second terminal, or requesting an MME for the attribute information of the second terminal; and utilizing the transceiver 830 to send a downlink RRC message to the first terminal, the downlink RRC message being configured to indicate the attribute information of the second terminal.

Optionally, the network device 800 is an MME. The processor 810 may be configured to call the instruction stored in the memory 820 to execute the following operations: utilizing the transceiver 830 to receive an uplink NAS message sent by the first terminal, the uplink NAS message being configured to request acquisition of the attribute information of the second terminal; and utilizing the transceiver 830 to send a downlink NAS message to the first terminal, the NSA response message being configured to indicate the attribute information of the second terminal.

Optionally, a radio frequency bandwidth supported by the second terminal is less than or equal to 1.4 MHZ.

It should be understood that the network device 800 may correspond to the network device in the method embodiment, and may implement corresponding operations of the network device, which will not be elaborated herein for simplicity.

Those of ordinary skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by virtue of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the disclosure, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A Device-to-Device (D2D) communication method, comprising:
   sending, by a first terminal, a first message to a network device, wherein the first message is configured to request acquisition of attribute information of a second terminal, and comprises an identifier of the second terminal and a requested content;
   receiving, by the first terminal, a second message sent by the network device, wherein the second message is configured to indicate the attribute information of the second terminal; and
   performing, by the first terminal, data transmission with the second terminal on the basis of the attribute information of the second terminal,
   wherein performing, by the first terminal, the data transmission with the second terminal on the basis of the attribute information of the second terminal further comprises:
   performing, by the first terminal, the data transmission with the second terminal on the basis of first capability information of the second terminal,
   wherein the first capability information comprises at least one of a maximum receiving bandwidth, a maximum sending bandwidth, a maximum data block size that can be sent, a maximum data block size that can be received, a number of transmit antennas or a number of receive antennas of the second terminal during data transmission with the first terminal.

2. The method according to claim 1, wherein the attribute information of the second terminal is the first capability information, and the first capability information is capability information of the second terminal to communicate with the first terminal.

3. The method according to claim 1, wherein the attribute information of the second terminal is second capability information, and the second capability information is capability information of the second terminal to communicate with the network device, and
   the method further comprises: before performing, by the first terminal, the data transmission with the second terminal on the basis of first capability information of the second terminal,
   determining, by the first terminal, the first capability information on the basis of the second capability information, wherein the first capability information is capability information of the second terminal to communicate with the first terminal.

4. The method according to claim 1, wherein
   sending, by the first terminal, the first message to the network device comprises: sending, by the first terminal, an uplink Radio Resource Control (RRC) message to a base station, wherein the uplink RRC message is configured to request acquisition of the attribute information of the second terminal; and
   receiving, by the first terminal, the second message sent by the network device comprises: receiving, by the first terminal, a downlink RRC message sent by the base station, wherein the downlink RRC message is configured to indicate the attribute information of the second terminal.

5. The method according to claim 1, wherein
   sending, by the first terminal, the first message to the network device comprises: sending, by the first terminal, an uplink Non-Access Stratum (NAS) message to a Mobility Management Entity (MME), wherein the uplink NAS message is configured to request acquisition of the attribute information of the second terminal; and
   receiving, by the first terminal, the second message sent by the network device comprises: receiving, by the first terminal, a downlink RRC message sent by the MME, wherein the downlink RRC message is configured to indicate the attribute information of the second terminal.

6. The method according to claim 1, wherein a radio frequency bandwidth supported by the second terminal is less than or equal to 1.4 MHZ.

7. A Device-to-Device (D2D) communication method, comprising:
   receiving, by a network device, a first message from a first terminal, wherein the first message is configured to request acquisition of attribute information of a second terminal, and comprises an identifier of the second terminal and a requested content;
   acquiring, by the network device, the attribute information of the second terminal according to the first message; and
   sending, by the network device, a second message to the first terminal, wherein the second message is configured to indicate the attribute information of the second terminal according to which the first terminal sends data to the second terminal,
   wherein the first terminal performs data transmission with the second terminal on the basis of first capability information of the second terminal, the first capability information comprises at least one of a maximum receiving bandwidth, a maximum sending bandwidth, a maximum data block size that can be sent, a maximum data block size that can be received, a number of transmit antennas or a number of receive antennas of the second terminal during data transmission with the first terminal.

8. The method according to claim 7, wherein the attribute information of the second terminal is the first capability information, and the first capability information is capability information of the second terminal to communicate with the first terminal.

9. The method according to claim 7, wherein the attribute information of the second terminal is second capability information, and the second capability information is capability information of the second terminal to communicate with the network device.

10. The method according to claim 7, wherein the network device is a base station;
receiving, by the network device, the first message sent by the first terminal comprises: receiving, by the base station, an uplink Radio Resource Control (RRC) message sent by the first terminal, wherein the uplink RRC message is configured to request acquisition of the attribute information of the second terminal;
acquiring, by the network device, the attribute information of the second terminal comprises: acquiring locally stored attribute information of the second terminal, or requesting a Mobility Management Entity (MME) for the attribute information of the second terminal; and
sending, by the network device, the second message to the second terminal comprises: sending, by the base station, a downlink RRC message to the first terminal, wherein the downlink RRC message is configured to indicate the attribute information of the second terminal.

11. The method according to claim 7, wherein the network device is an MME;
receiving, by the network device, the first message sent by the first terminal comprises: receiving, by the MME, an uplink Non-Access Stratum (NAS) message sent by the first terminal, wherein the uplink NAS message is configured to request acquisition of the attribute information of the second terminal;
acquiring, by the network device, the attribute information of the second terminal comprises: acquiring locally stored attribute information of the second terminal, or requesting a NAS for the attribute information of the second terminal; and
sending, by the network device, the second message to the second terminal comprises: sending, by the MME, a downlink NAS message to the first terminal, wherein the downlink NAS message is configured to indicate the attribute information of the second terminal.

12. A terminal, comprising: a memory, a processor, and a computer program stored on the memory and capable of running on the processor, wherein the computer program, when executed by the processor, cause the processor to execute operations comprising:
sending a first message to a network device, wherein the first message is configured to request acquisition of attribute information of a second terminal, and comprises an identifier of the second terminal and a requested content;
receiving a second message sent by the network device, wherein the second message is configured to indicate the attribute information of the second terminal; and
performing Device-to-Device (D2D) communication with the second terminal on the basis of the attribute information of the second terminal,
wherein performing, by the first terminal, the data transmission with the second terminal on the basis of the attribute information of the second terminal further comprises:
performing, by the first terminal, the data transmission with the second terminal on the basis of first capability information of the second terminal,
wherein the first capability information comprises at least one of a maximum receiving bandwidth, a maximum sending bandwidth, a maximum data block size that can be sent, a maximum data block size that can be received, a number of transmit antennas or a number of receive antennas of the second terminal during data transmission with the first terminal.

13. The terminal according to claim 12, wherein the attribute information of the second terminal is the first capability information, and the first capability information is capability information of the second terminal to communicate with the first terminal.

14. The terminal according to claim 12, wherein the attribute information of the second terminal is second capability information, and the second capability information is capability information of the second terminal to communicate with the network device, and
the processor is specifically configured to:
determine first capability information on the basis of the second capability information, wherein the first capability information is capability information of the second terminal to communicate with the first terminal.

15. The terminal according to claim 12, wherein
the processor is specifically configured to: send an uplink Radio Resource Control (RRC) message to a base station, wherein the uplink RRC message is configured to request acquisition of the attribute information of the second terminal; and
the processor is specifically configured to receive a downlink RRC message sent by the base station, wherein the downlink RRC message is configured to indicate the attribute information of the second terminal.

16. The terminal according to claim 12, wherein
the processor is specifically configured to: send an uplink Non-Access Stratum (NAS) message to a Mobility Management Entity (MME), wherein the uplink NAS message is configured to request acquisition of the attribute information of the second terminal; and
the processor is specifically configured to: receive a downlink RRC message sent by the MME, wherein the downlink RRC message is configured to indicate the attribute information of the second terminal.

17. The terminal according to claim 12, wherein a radio frequency bandwidth supported by the second terminal is less than or equal to 1.4 MHZ.

* * * * *